United States Patent [19]

Hannum

[11] Patent Number: 4,645,598
[45] Date of Patent: Feb. 24, 1987

[54] WATER TREATMENT PLASTIC PRODUCTS FOR RECTANGULAR CLARIFIERS

[75] Inventor: Joseph R. Hannum, Norristown, Pa.

[73] Assignee: The Budd Company, Troy, Mich.

[21] Appl. No.: 722,047

[22] Filed: Apr. 11, 1985

[51] Int. Cl.$^4$ ...................... B01D 21/04; B01D 21/20
[52] U.S. Cl. .................................. 210/232; 210/526; 210/541; 210/542
[58] Field of Search ............... 210/526, 541, 542, 232; 411/904, 907, 908; 74/DIG. 10

[56] References Cited

PUBLICATIONS

"Zytel Nylon Resin"; Bulletin A-2688, Dupont Polychemicals Dept., Sep. 26, 1957, pp. 12 & 13.
"Chain Drives"; Product Engineering, Mar. 14, 1966, p. 65.

Primary Examiner—Frank Sever
Attorney, Agent, or Firm—Edward M. Farrell; Herman Foster; T. I. Davenport

[57] ABSTRACT

A water and sewer treatment rectangular tank is provided wherein substantially all the working parts are made of non-metallic material. The system includes a telescoping non-metallic drive shaft connected to sprockets for driving chain with the sprockets being mounted to non-metallic stub posts which are mounted to the side walls of the tank.

10 Claims, 8 Drawing Figures

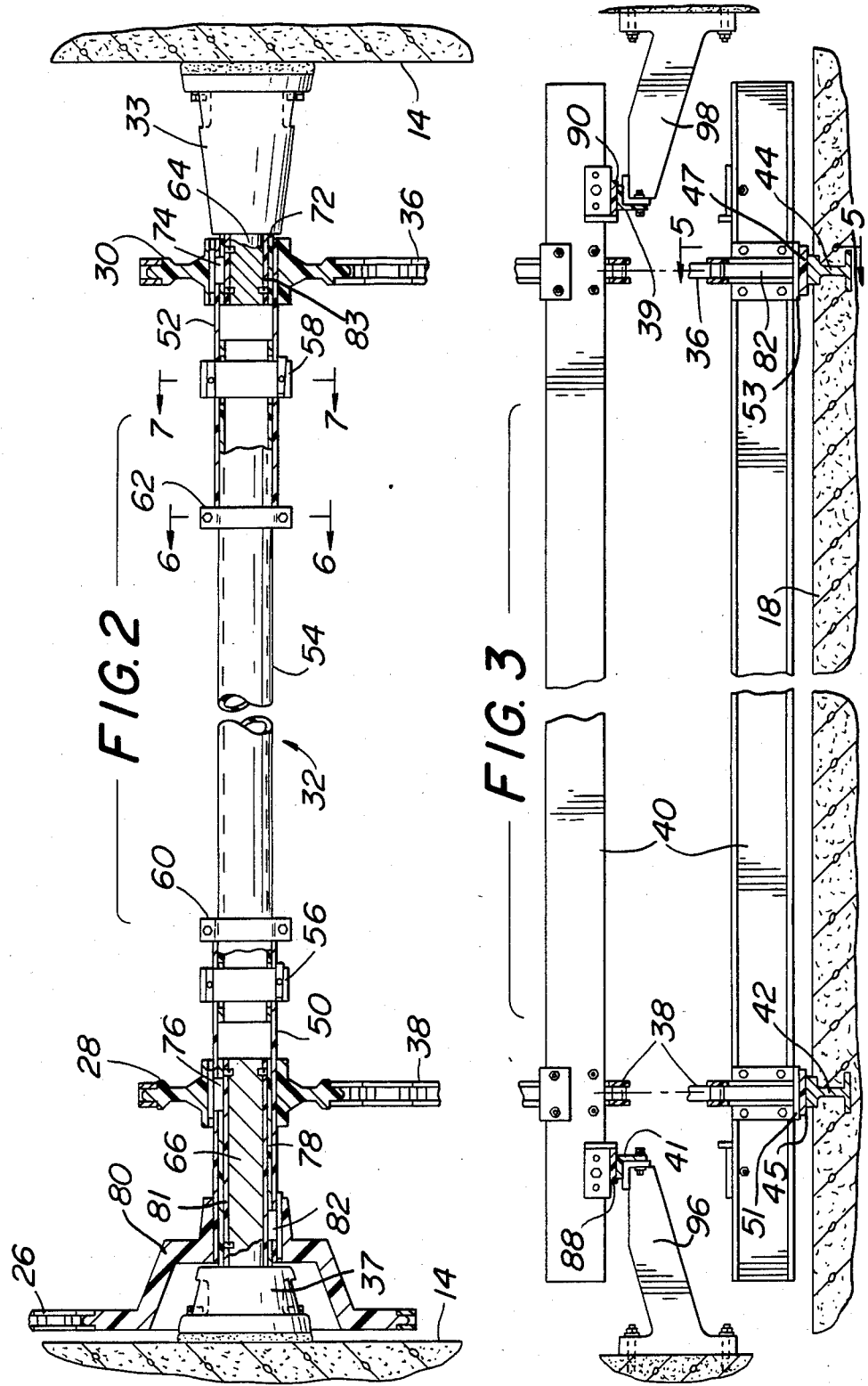

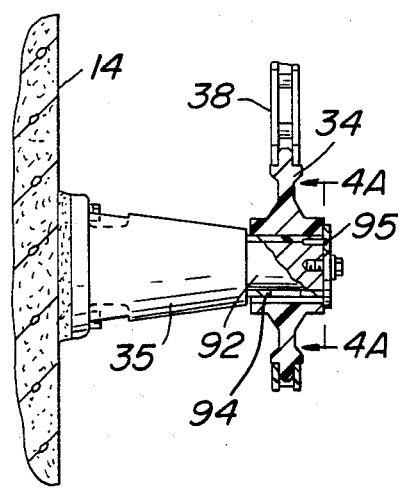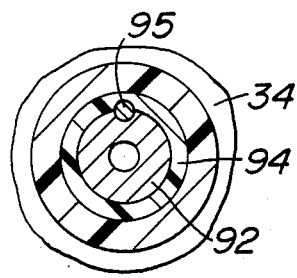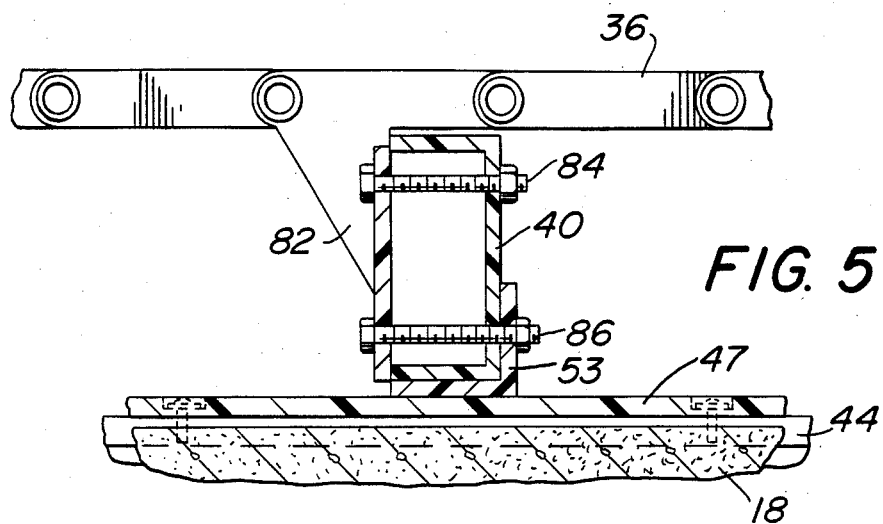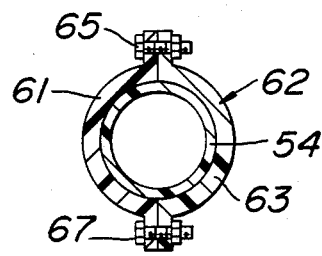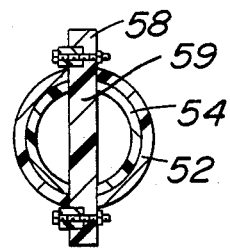

WATER TREATMENT PLASTIC PRODUCTS FOR RECTANGULAR CLARIFIERS

BACKGROUND OF THE INVENTION

Water and sewage treatment systems are well known. For more than 50 years, rectangular clarifiers (rectangular concrete tanks) have been used in the treatment and purification of sewage, sewer drain, and drinking water. They are used to remove those materials which are either not biodegradable or cannot be chemically treated during the water purification process. Typically, these clarifiers have been referred to as either primary (4-shaft systems) or secondary clarifiers, (b 3-shaft systems). A primary clarifier removes: (1) non-biodegradable solids (i.e. grit) that precipitate to the bottom of the tank where they are collected, and (2) scum which is collected from the top surface of the water. A secondary clarifier removes the non-biodegradable solids that precipitate to the bottom of the tank that have not been removed during primary clarification. This can be accomplished in the following manner:

Systems include motor-driven sprockets which move two parallel chains which have flight members attached thereto. The flight members scrape the floor of rectangular clarifier tank in one direction, gathering all solid waste materials which have fallen to the floor of the tank and moving them to a cross collector located at one end of rectangular tank. The solids collected in the cross collector are then pumped to a location for additional treatment or final disposal.

Both primary and secondary clarifiers perform this function. Primary systems perform an additional function. Waste materials which are not biodegradable and have specific gravity less than water (i.e., soap or oils) float to the top and sit on surface of water. This solution is commonly referred to as scum. 4-shaft systems have flights protruding half out of the water, running in the opposite direction (from those flights moving solids on the bottom of tank), supported on return rails. The flights move in one direction on top surface of water and push this waste into an element called a scum collector, where these waste materials are removed to a location for additional treatment and final disposal. A number of different stages are generally used in the overall treatment system. Historically, all mechanical components in rectangular clarification systems were metallic, driving first-grade redwood flights. These components typically consisted of steel drive and idler shafts connected to babbitted steel wall bearings which are set in steel wall brackets. Steel chain to which wooden flights are attached are driven by steel sprockets. All return rails attaching rail brackets and floor rails are made from steel. Wear shoes have also been made from steel. The chemicals and oxygen used to treat the water and the general water environment cause severe corrosion of all steel components. It is common for the steel components to be porous, allowing grit and scale to pack in the surface of metal parts. The combined effects of these problems cause severely accelerated wear of all metallic components. Steel drive and steel idler shafts become permanently stuck in steel wall bearings and will not rotate, which causes system failures. Metallic parts are energy consuming. They weigh six times more than plastic. Plastic components often have more than double the life of steel parts. Because of their light weight, they can be installed or repaired at one-third the cost of steel components.

Many treatment facilities have begun to replace metal parts with plastic because they are non-corrosive, energy efficient, light weight, less cost to install or repair, and have proven to be superior in wear and performance.

OBJECTS OF THE INVENTION

It is an object of this invention to provide improved rectangular water clarifier and sewage treatment system comprised of substantially all plastic working components.

It is a further object of this invention to provide an improved rectangular water clarifier and sewage treatment system having novel plastic drive shaft assemblies mounted over plastic drive stub shaft spindle and replaceable tubular bearing assemblies.

It is still a further object of this invention to provide an improved rectangular water clarifier and sewage treatment system having novel plastic stub shaft spindle and replaceable tubular bearing assembly for plastic idler sprockets.

It is still a further object of this invention to provide improved rectangular water clarifier and sewage treatment system having novel plastic return rail, return rail bracket, and wear show wear strips.

DESCRIPTION OF THE DRAWINGS

FIG. 2 is a view, taken along lines 2—2 of FIG. 1;
FIG. 3 is a view, taken along lines 3—3 of FIG. 1:
FIG. 4 is a view, taken along lines 4—4 of FIG. 1;
FIG. 4A is a cross sectional view taken along lines 4—4 of FIG. 4;
FIG. 5 is a view, taken along lines 5—5 of FIG. 3;
FIG. 6 is a view, taken along lines 6—6 of FIG. 2, and
FIG. 7 is a view, taken along lines 7—7 of FIG. 2.

SUMMARY OF THE INVENTION

Figure 1:
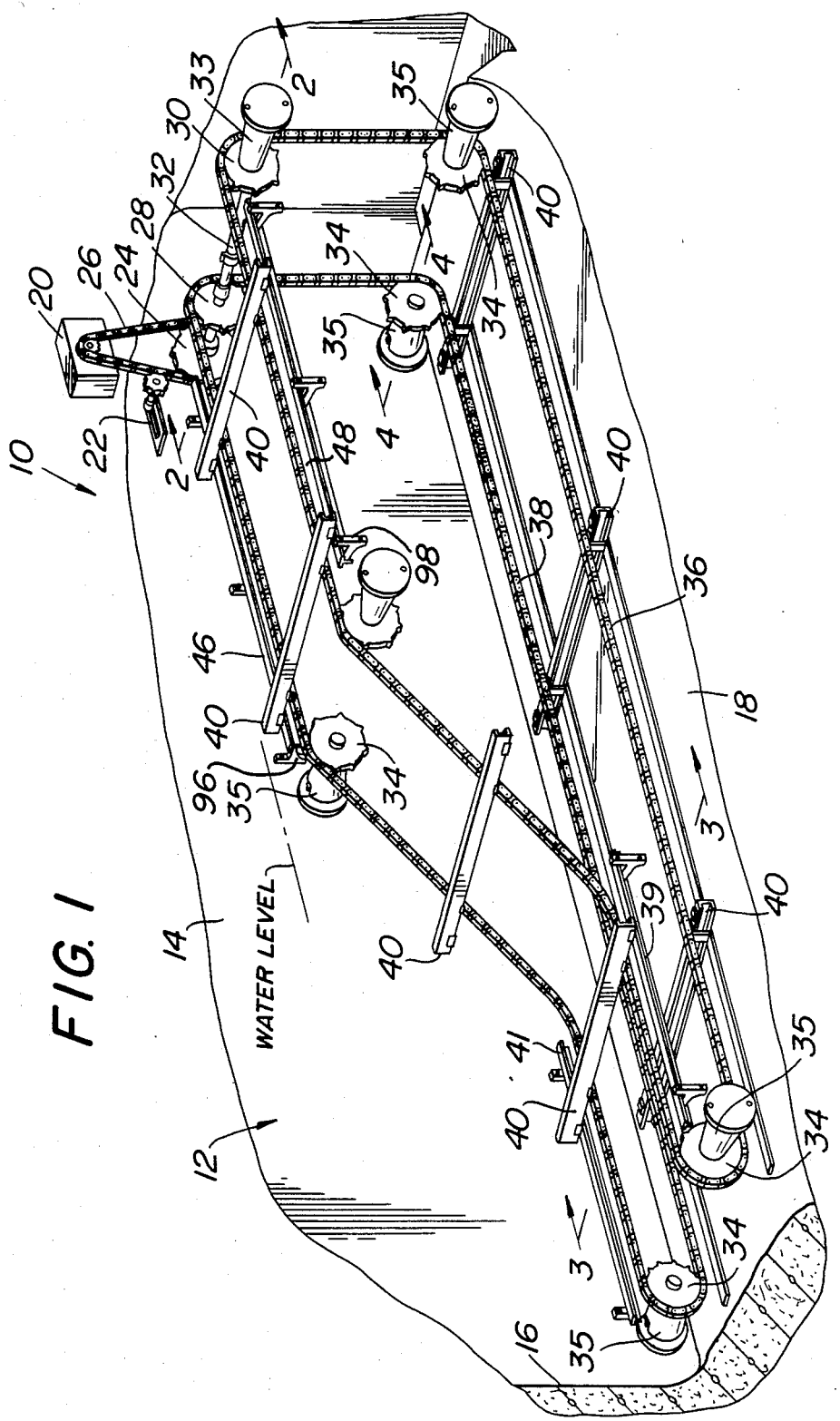
FIG. 1 is an isometric view of water and sewer treatment system utilizing products involving the present inventions.

In accordance with the present invention, a water and sewage treatment system comprises a rectangular tank in substantially all plastic parts including stub posts having spindles disposed on bearings. The stub posts are connected to sidewalls of the tank with spindles extending into drive shafts and sprockets. A drive shaft between two drive sprockets comprise telescoping members to facilitate assembly and disassembly of parts within the system. On sprockets two strands of chain are moved through the turning of drive shaft and free rotation of idler sprockets on stub post.

Other objects and advantages of the present invention will be apparent and suggest themselves to those skilled in the art, from a reading of the following specification and claims, taken in conjunction with the accompanying drawings.

DESCRIPTION OF THE INVENTION

Referring to FIG. 1, a water-sewage treatment system 10 includes a rectangular tank 12 including side walls 14 (only one of which is illustrated), end walls 16 and a bottom floor 18. During operation, the tank 12 is filled with sewage or waste material to be treated or purified (not illustrated).

The operating mechanism comprises a motor drive unit with shear pin drive sprocket assembly 20 and a drive chain take up unit 22. The unit 20 drives a sprocket 24 through a drive chain 26. The sprocket 24 drives a second sprocket 28 through means to be illustrated in subsequent figures of the drawing.

The sprocket 28 drives sprocket 30 through a shaft assembly 32. The drive sprockets 24 and 30 are secured to drive shaft 32, which rotates on stub posts 33 and 37, which in turn are connected to side walls 14. The idler sprockets 34 are free turning and are connected to stub posts 35 which are also secured to the side walls 14. These stub posts are not connected to any shafts, with one such stub being illustrated in FIG. 4.

When the sprockets 28 and 30 are driven, they drive the chains 36 and 38. Flight members 40 are secured to the chains 36 and 38. The flight members ride on bottom wear plates or tracks 42 and 44 (FIG. 3) and on top tracks, with wear plates 46 and 48. The flight members 40 scrape the top of the waste material in the tank 12 and pass it to the next stage in the overall treatment system, in a conventional manner. The tracks 42 and 44 include wear plates 45 and 47. The flight members 40 include wear shoes 51 and 53.

In a preferred embodiment, the elements illustrated in FIG. 1 are made of non-metallic material, such as plastics including Nylon-6 which have high wear properties.

The completely non-metallic sludge collection system illustrated is designed to eliminate corrosion problems and dramatically reduce installation and maintenance costs in rectangular water clarifier and sewage treatment settling tanks. The system illustrated provides at least double the service life of conventional cast and malleable iron components. Engineered plastic chains, sprockets and scraper flights have proved to be the ideal replacements for metallic parts in hundreds of settling tank installations throughout the country. The system illustrated in FIG. 1, when made of non-metallic products provides an entire sludge collection system that is totally integrated to yield maximum life and cost efficiency. In addition the system is made simpler by designing out the need for idler sprocket shafts in either new or retrofit installations.

While prior art systems have included some non-metallic products, the use of plastic collector chain drive and idler sprockets in combination with non-metallic stub shaft spindle and bearing assemblies and a tubular drive shaft assembly have not been used. The stub posts and drive shafts have had to be redesigned from their original metal counterparts when plastics, such as Nylon-6, are used.

Made of high strength, light weight cast Nylon-6, the one-piece stub shaft spindles are stud-mounted to the tank walls at each sprocket location in place of cast iron wall bearing and shaft housings. Babbitted or bronze bearings have been replaced with tubular cast nylon bearings secured to the spindles with a non-metallic key. Free-turning idler sprockets are held in place with a cast nylon retainer plate fastened to the stub shaft spindle with a type 316 stainless steel bolt, while drive sprockets are attached to their shafts with a keyway and key, and set screws.

The drive shaft is made from specially formulated glass fiber-reinforced polyester tube sections that telescope for easy assembly to the stub shaft spindles. Three sections are used for cross collector, and for primary and secondary tank drive assemblies. When expanded and slip-fitted over the stub shaft spindle bearings, shaft sections are locked together with cast Nylon-6 interlocking key assembly and cast Nylon-6 shaft collars.

The stub shaft spindles, bearings, drive shafts and rail components are all designed for use in conjunction with cast nylon drive and idler sprockets, reinforced nylon drive chain, molded reinforced polyester collector chain, pultruded fiberglass flights, and cast nylon wearshoes.

Among the outstanding features of all these system components are their lightweight, strength and durability.

Component for component, the non-metallic parts averaged at least 75% lighter than the iron or steel parts they are designed to replace. This reduced weight not only saves operating energy, but allows installation and regular periodic tank maintenance to be performed more quickly with less labor.

For example, a standard 23-tooth, 22.23 inch pitch diameter cast nylon drive sprocket weighs approximately 37 pounds, while a comparable cast iron or fabricated steel sprocket can weigh well over 110 pounds. Thus one man can easily install or replace a plastic sprocket or bearing by himself without the aid of a crane or hoist.

Chain installation and maintenance also requires a great deal less effort, since a 10 foot section of reinforced polyester chain weighs just 14 pounds compared with 57 pounds for an equal length of steel or malleable iron chain.

The various engineered plastic materials used to make the different sludge collector system components were selected on the basis of extensive laboratory research and evaluation of their performance in more severe applications. Among the principal criteria were resistance to water and chemicals commonly found in water and sewage treatment facilities, abrasion and corrosion resistance, tensile and impact strength, dimensional stability, and cost effectiveness.

Cast nylon, long a cost-saving workhorse in heavy duty wear applications such as elevator buckets for sewage wastewater grit removal, was found to be best suited on all counts for sprockets, shaft spindles and bearings, wear shoes and wear strips. This material, —Nylon-6—, is noted for its superior strength, rigidity, toughness, low creep, and abrasion and chemical resistance. It also is the most dimensionally stable of all the castable nylons under high moisture conditions. Immersion in water not only enhances its self-lubricity, but also improves its physical impact strength.

The ability of Nylon-6 to be cast in large precision structural shapes permits the new stub shaft spindles to handle the full load of collector chain and flights moving at speeds up to seven feet per minute —well above normal operating speed of 1-3 feet per minute. The result is elimination of the need for heavy steel idler sprocket shafts. Plastic spindles also allow the use of lightweight, high torque tubular shaft sections for the head shaft sprocket drive assembly.

Referring to FIGS. 1, 2, 6 and 7, details relating to the non-metallic stub posts, such as stub posts 33 and 37, and drive shaft 32 are illustrated.

In the embodiment illustrated, the shaft 32 comprises, three telescoping tubular members comprising two end members 50 and 52 and intermediate tubular member 54. The intermediate tubular member 54 is disposed to fit into the end tubular members 50 and 52. The tubular members 50 and 52 extend through sprockets 28 and 30, respectively, and connected to move with the sprockets, as will be described.

A tube interlock key assembly 56 is provided for tubular members 50 and 54. In like manner, a tube interlock key assembly 58 is provided for the tubular members 52 and 54. This key assembly is illustrated in FIG. 7 wherein locking bar 59 extends through openings in tubular members 52 and 54 and held in place by any suitable fastening means. A shaft collar 60 which may be tightened, FIG. 6 provides a firm contact around the tubular member 54. In like manner, a shaft collar 62 is tightened around tubular member 54 to provide good contact therebetween. The shaft collars 60 and 62 prevent lateral movements of the intermediate member 54 with respect to the end members 50 and 52. The arrangements of the tube interlock assembly and shaft collars prevent relative movements between the members 50, 52 and 54 and permits the shaft 32 to operate as an integral piece.

Providing the shaft 32 in multiple pieces facilitates the assembly and disassembly of various parts in the system, including the sprockets, chains and stub posts. The tubular drive shaft members are non-metallic, preferably being made of epoxy fiberglass. The shaft collars 60 and 62 are of cast Nylon 6. As illustrated in FIG. 6, the shaft collar 62 is comprised of a pair of half rings 61 and 63 around the tubular member 54 held together by screws 65 and 67.

Stub posts 33 and 37 are secured to side walls 14 of the tank 12 (FIG. 1). The stub posts 33 and 37 include tubular bearings 64 and 66, respectively, and which are secured to the outer areas of the spindles set screws. Nylon sleeves 83 and 81 are fixed to the shafts 64 and 66 by set screws. Bearing elements 78 and 72 are disposed to rotate freely around the sleeves 81 and 83 along with the sprockets 28 and 30.

The stub post 37 for the drive sprocket 28 which may include a shear pin (not illustrated), includes a stub shaft spindle and bearing assembly for the drive sprocket. The stub shaft spindle is a solid one piece construction made from Cast Nylon 6 material or equivalent. Bearing is secured to spindle with non-metallic screws. Outside diameter of the stub shaft bearing slide-fit to inside diameter of non-metallic telescope drive shaft assembly.

A shaft key 74 extends through member 52 and bearing 72 and connects the sprocket 30 to the member 52. Thus the member 52, sprocket 30 and bearing 72 are all connected to move together. In a similar fashion, shaft key 76 extends through shaft 50 and bearing 78 and connects the sprocket 28 to the member 50. A bull sprocket 80 has a shaft key 82 extending through the sleeve 78 to the member 50. The entire assembly including the bull sprocket 80 drive shaft assembly 32 all move together when the sprocket 24 is driven by the chain 26.

The stub post 35 (FIG. 4) for the idler sprocket 34 comprises a stub shaft spindle made of a solid one piece construction from Nylon 6 material, predrilled for mounting to wall studs. Tubular idler stub shaft bearing 92 is constructed from cast Nylon 6 material or equivalent. A bearing 94 is secured to the spindle with a non-metallic key or pin 95. Stub shaft spindle will have cast Nylon 6 sprocket retainer plate mounted with one, 1"-8×4" long hex head bolt, flat washer, split lock washer 316 stainless steel.

Referring to FIGS. 3 and 5, the flight members 40 are secured to chains 36 and 38 with FIG. 5 illustrating the mechanical connections of one of the flight members to the chain 36. Attachment link 82 connected the flight member 40 to the chain 36 by nut and bolt arrangements. A wear shoe plate 88 is secured to the flight member 40 and disposed one of the wear strip track members.

A plurality of runway support brackets 96 and 98 to receive runway tracks 30 and 41. Wear strips 80 and 90 are secured to the flight member 40 and disposed to ride on the tracks 39 and 41.

What is claimed is:

1. In a rectangular water clarifier and sewage treatment system including a pair of side and end walls for overcoming high labor costs during assembly and disassembly of said system,
    (a) a pair of plastic sprockets for driving said chains;
    (b) a pair of plastic driven chains;
    (c) track members;
    (d) a plurality of flight members secured to said drive chains and disposed to ride on said track members;
    (e) a telescoping non-metallic drive shaft connected between said pair of drive sprockets; and
    (f) non-metallic stub post spindles secured to said side walls with said sprockets drive shaft being freely rotatable thereon, said shaft including means for enabling ready removal from said stub post spindle during disassembly of said system to permit repair, removal and replacement of said sprockets and chains with a substantial reduction in man power requirements.

2. A combination as set forth in claim 1 wherein said sprockets, track members, drive shaft and said spindles all comprise plastic members.

3. In a rectangular water clarifier and sewage treatment system including a pair of sprockets to drive a pair of main chains, spindles secured to side walls of said rectangluar system for receiving said sprockets and means for driving one of said sprockets for facilitating the disassembly of said system in a minimum amount of man power time requirments,
    a non-metallic drive shaft connecting said pair of sprockets comprising:
    a plurality of telescoping tubular members normally connected together during operation and adapted to be disassembled for permitting repair, removal and replacement of said sprocket and chains with a substantial reduction in labor man hour requirements.

4. A drive shaft as set forth in claim 3 wherein said telescoping tubular members comprises three glass fiber-reinforced tube sections.

5. A drive shaft as set forth in claim 4 wherein tube interlock members are provided and extend through openings in said tube sections to prevent relative rotational movement between any of said three tube sections.

6. A drive shaft as set forth in claim 5 wherein shaft collars are connected around the two end tube sections in contact with the middle tube section to prevent lateral movement between any of said tube sections.

7. In a water clarifier and sewage treatment system, a stub post for connection to a side wall in a tank for supporting a drive sprocket having a non-metallic shaft connected thereto to prevent corrosion from developing between said stub post and said shaft to minimize the down time requirements resulting from the need of separating said tubular shaft from said post, comprising:
    (a) a main body,
    (b) a plastic shaft extending from said main body;
    (c) a plastic collar secured to said shaft;

(d) a plastic bearing surrounding said collar; and
(e) means for connecting said non-metallic shaft over said bearing to permit said tubular shaft and bearing with said connected sprocket to ride freely on said plastic collar during operation and for permitting easy separation when repairs or replacements are required in said system.

8. A stub post as set forth in claim 7 wherein screws are provided to secure said plastic collar to said shaft.

9. A stub post as set forth in claim 8 when a pin element is provided to connect said tubular drive member to said bearing.

10. A stub post comprising means for connecting to a side wall of a tank for supporting an idler sprocket driven by a chain for eliminating the requirement for idler shafts to reduce the cost of a water clarifier and sewage treatment system including
(a) a main body;
(b) a plastic shaft extending from said main body; and
(c) a plastic collar surrounding said shaft;
(d) a plastic pin for fixing said collar to said shaft, and
(e) said sprocket being supported to rotate freely on said bearing during operation.

* * * * *